United States Patent [19]

Bullis et al.

[11] Patent Number: 5,008,774

[45] Date of Patent: Apr. 16, 1991

[54] CAPACITIVE ACCELEROMETER WITH MID-PLANE PROOF MASS

[75] Inventors: Robert H. Bullis, Avon; James L. Swindal, East Hampton, both of Conn.

[73] Assignee: United Technologies Corporation, Hartford, Conn.

[21] Appl. No.: 317,258

[22] Filed: Feb. 28, 1989

[51] Int. Cl.⁵ .................. G01P 15/02; H01G 7/00
[52] U.S. Cl. .............................. 361/283; 73/517 R
[58] Field of Search ........................ 361/283; 73/517

[56] References Cited

U.S. PATENT DOCUMENTS

| | | | |
|---|---|---|---|
| 4,193,291 | 3/1980 | Lynnworth | 73/32 A |
| 4,244,225 | 1/1981 | Greenwood | 73/517 AV |
| 4,574,327 | 3/1986 | Wilner | 361/283 |
| 4,609,968 | 9/1986 | Wilner | 361/320 |
| 4,658,647 | 4/1987 | Shintani et al. | 73/517 B |
| 4,679,434 | 7/1987 | Stewart | 73/517 B |
| 4,699,006 | 10/1987 | Boxenhorn | 73/517 |

FOREIGN PATENT DOCUMENTS

| | | |
|---|---|---|
| 2130372 | 5/1984 | United Kingdom . |
| 2130373 | 5/1984 | United Kingdom . |
| 2158945 | 5/1984 | United Kingdom . |

*Primary Examiner*—Donald A. Griffin

[57] ABSTRACT

A micromachined three-plate capacitive accelerometer incorporates a "sandwich" proof mass formed from two layers that are boron-doped to define hinges attached essentially to the midplane of the proof mass by being placed abutting a bonding interface region at the midplane.

7 Claims, 2 Drawing Sheets

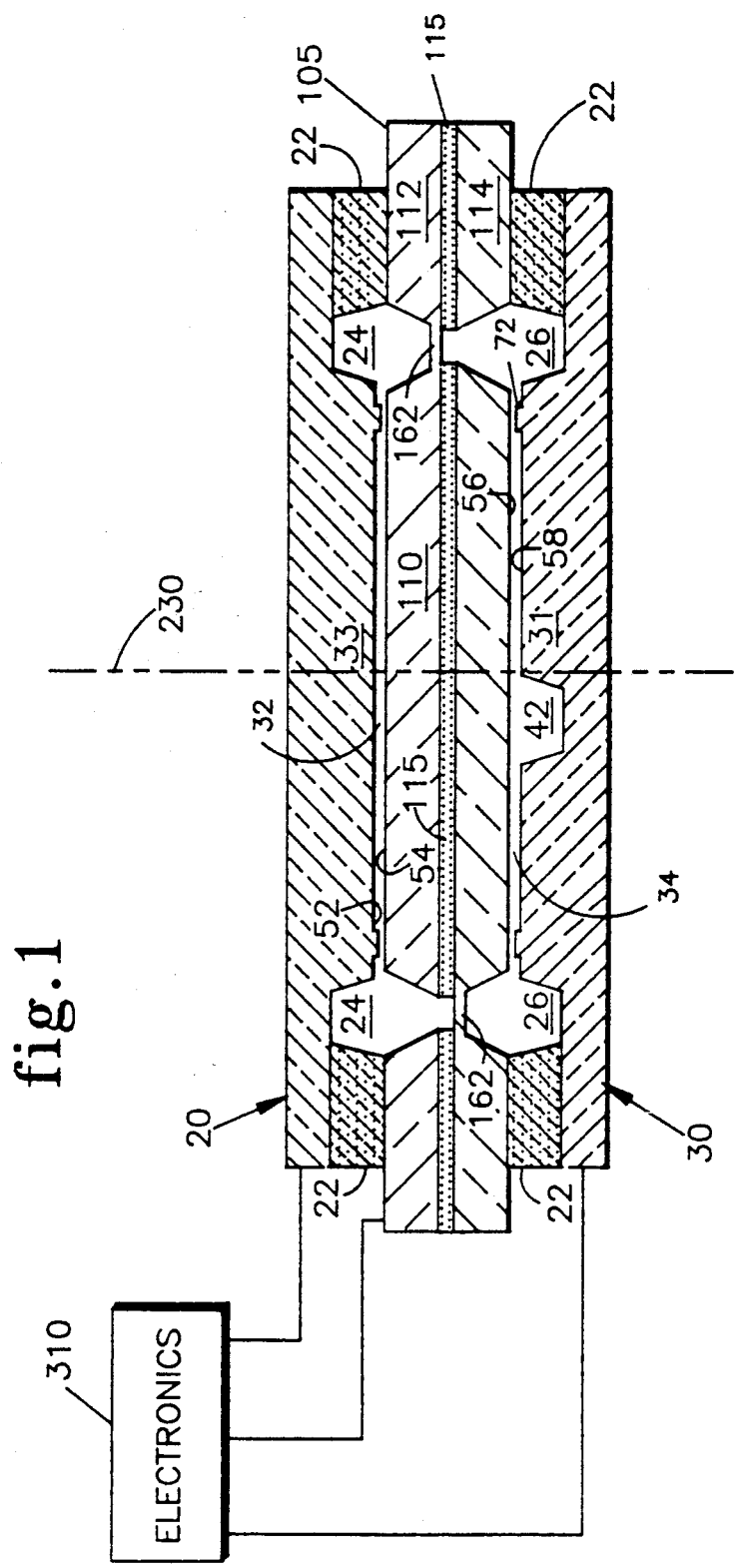

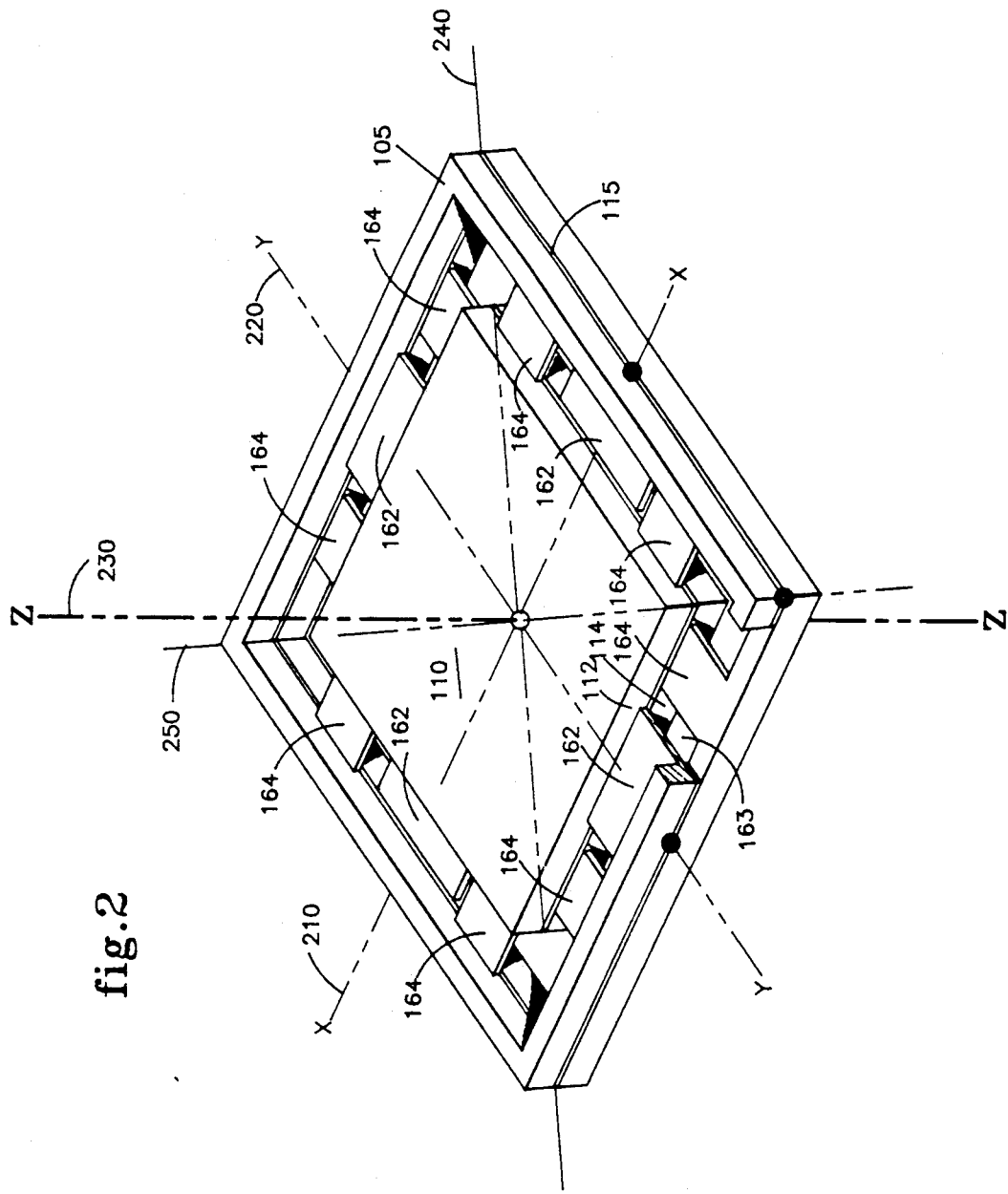

CAPACITIVE ACCELEROMETER WITH MID-PLANE PROOF MASS

RELATED APPLICATIONS

This invention is related to inventions disclosed in commonly owned copending applications, U.S. Ser. No. 7/317,240; U.S. Ser. No. 7/317/309; U.S. Ser. No. 7/317/239; U.S. Ser. No. 7/317/238; U.S. Ser. No. 7/317/237 and U.S. Ser. No. 7/317/217, filed contemporaneously herewith.

TECHNICAL FIELD

This invention relates to solid state capacitive accelerometers micro-machined from silicon.

BACKGROUND ART

In the field of accelerometers, it is known to form a small compact accelerometer by etching the relevant parts out of silicon. U.S. Pat. No. 4,574,327 illustrates one version of such a transducer in which a proof mass having a textured surface containing many grooves and apertures extending through the proof mass has its surface tailored in order to achieve the desired frequency response by using the squeeze-film damping phenomenon.

Other forms of micro-accelerometers employ cantilever proof masses that introduce an asymmetry that can give an undesirable cross-axis sensitivity. The preceding '327 patent avoids that asymmetric effect by showing a flexible hinge all around the proof mass so that the response is directed preferentially to an axis perpendicular to the plane of the proof mass.

Preferably, the hinges are mounted in the mid-plane of the proof mass to avoid torques that will couple accelerations on different axes, but accurate location in the mid-plane is difficult.

The problem solved by the present invention is that prior art mid-plane proof masses were formed by boron-doping the top surface of a silicon wafer and then growing an epitaxial layer above the doped surface to a height that matched the thickness of the silicon under the doped layer. This was a very slow and expensive process.

More important, this process invariably leads to induced stresses in the proof mass structure formed thereby, leading to high device temperature sensitivities and lack of device-to-device reproducibility in accelerometer span and bias offset. Alternate etching from both sides of an undoped wafer has been employed to define mid-plane hinges. This process is controlled only by the duration of the etch. However, since the thickness of the proof mass structure is typically 10 mils, while hinge thicknesses are typically 0.1 mils, this technique does not lead to good device-to-device reproducibility on a wafer-to-wafer basis.

DISCLOSURE OF INVENTION

The invention relates to an improved capacitive accelerometer in which a three-plate capacitor is formed with the proof mass being the central plate. The proof mass is suspended from a silicon frame by means of a novel arrangement of flexures, located at the top and bottom surfaces of a mid-plane interface region, that have highly improved symmetry resulting in decreased cross-axis coupling while at the same time being easy to fabricate to an extremely high precision and reproducibility with minimal induced stress in the critical hinge support region and attached proof mass structure.

BRIEF DESCRIPTION OF DRAWINGS

FIG. 2 illustrates in perspective a proof mass constructed according to the invention.

BEST MODE FOR CARRYING OUT THE INVENTION

Figure 1:
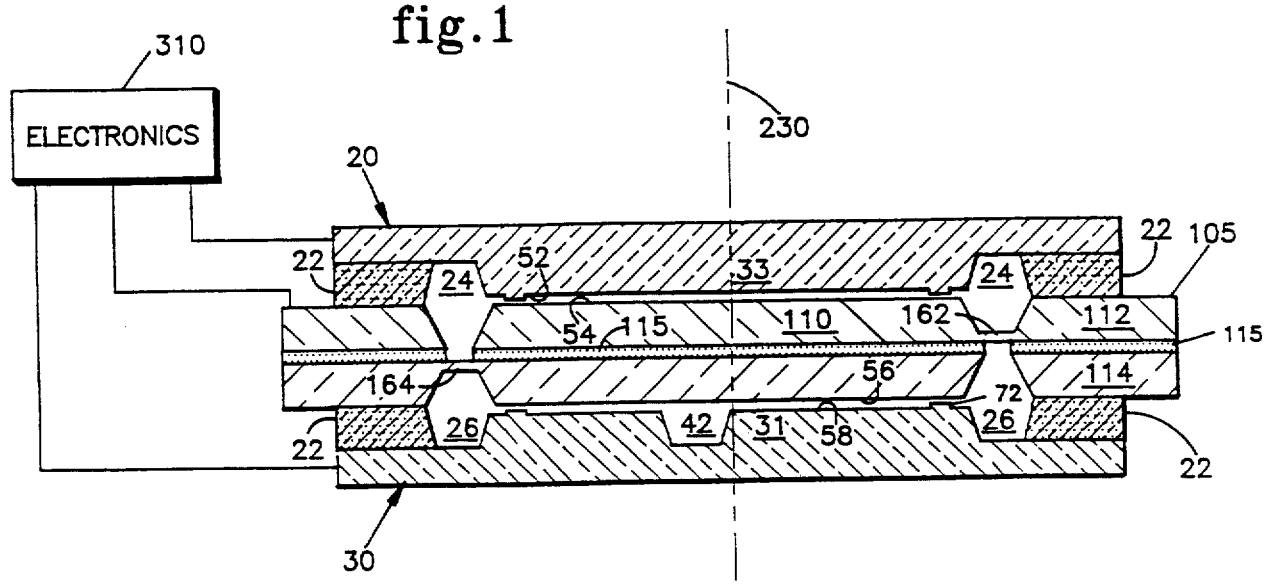
FIG. 1 illustrates in cross section an embodiment of the invention.

Referring now to FIG. 1, there is shown in cross section an embodiment of the invention adapted to register acceleration coaxial with an axis 230 extending upwardly through the drawing. Electrically, the apparatus is a three-plate capacitor in which top and bottom plates 20 and 30 respectively are formed of rigid silicon members that are bonded to an intermediate silicon frame 105 that contains a proof mass 110. Bonding, by means of standard anodic or thermal methods, is between frame 105 and glass borders 22 formed on the top and bottom plates 20 and 30 using standard glass deposition and etching techniques. Proof mass 110 is formed from two silicon slabs 112 and 114 joined in interface region 115 by any convenient bonding process, such as sputtering a layer of aluminum on the mating surfaces and heating the "sandwich" at 700° C. for 1 hour to bond the two slabs. Alternatively, glass dielectric bond could be employed in place of the aluminum. The surfaces touching interface region 115 are boron-doped with a pattern that will correspond to the hinges to be formed in a subsequent etching step. As is customary, the vertical dimension in the drawing is greatly exaggerated in order to show very thin features of the invention.

FIG. 1 illustrates an embodiment of the invention in which the left and right flexures are in the bottom and top slabs, respectively, in order to emphasize the composite nature of the proof mass. Those skilled in the art will readily be able to devise many other flexure layouts using the invention.

Further differences between the prior art and the present invention may be illustrated conveniently in FIG. 2, showing frame 105 and proof mass 110 in simplified perspective. The same axis 230 is the Z axis in this drawing with corresponding X axis 210 and Y axis 220 which lie on the midplane of the proof mass and pass through its centroid. Proof mass 110 is surrounded by a gap 163 formed by anisotropic etching, illustratively EDP etching, in the step that defines the flexures 162 and 164. A distinction between prior art arrangements and the present invention is that of the layout of the flexures, or hinges, which couple proof mass 110 to frame 105. Looking along Y axis 220, it can be seen that there is a relatively large flexure 162 in the upper slab at both the top and bottom of the drawing. The flexure in each slab is in a surface, called the flexure surface, that is adjacent to interface region 115. The two pieces of silicon 112 and 114 that are bonded together will be referred to as slabs in order to distinguish them from the capacitor plates. In the bottom slab of proof mass 110, there is a pair of smaller flexures 164 disposed symmetrically about Y axis 220, each having half the width of flexure 162, so that the total stiffness of the flexures on the top and bottom surface is the same. Also, on the lower portion of gap 163 on the opposite side of the proof mass, there is a symmetric arrangement of corresponding flexures 162 and 164. Thus, not only is the top and bottom of the arrangement symmetric about axis 220, but also it is symmetric about X axis 210 since there is a balance on the top and bottom of the drawing.

On the left and right of the drawing, there is a corresponding symmetric arrangement of flexures 164 and 162 that differs from the top and bottom sides in that the smaller flexures 164 are on the top slab and the larger one, 162, is on the bottom slab. The symmetry of this arrangement can be seen by looking at axes 240 and 250, respectively, which extend along the diagonals of the square proof mass 110 midplane Looking at axis 240, for example, there is a flexure 164 on the bottom surface of proof mass 110 on the left and a corresponding flexure 164 on the top surface on the right. This would induce a slight torque about axis 240 but that is balanced by corresponding flexures 162 on the bottom right and top left, respectively. Similarly, about axis 250, there is a corresponding top/bottom matching of flexures, both flexures being spaced equally from the corner. For purposes of this application, the arrangement shown in FIG. 1 will be referred to as being symmetric about the diagonal plane defined by axes 230 and 240 and axes 230 and 250, even though corresponding flexures are in opposite top or bottom slabs of the proof mass.

The flexure layout is not, of course, confined to a three-flexure per side arrangement and many other arrangements relative to widths, numbers and placement of the flexures will be evident to those skilled in the art. The principle being followed in this embodiment is that of high symmetry about the transverse axes 210 and 220 together with the out of plane symmetry about the diagonal axes 240 and 250. Since the flexures 162 and 164 will be on the order of microns, as will layer 115, any torques or asymmetry introduced by the difference in vertical position will be extremely small.

The sequence of fabrication is that the two silicon wafers that will become slabs 112 and 114 are doped with boron in a pattern corresponding to the flexures 162 and 164 in each slab. A layer of bonding material, such as sputtered aluminum is applied to each doped surface. In the case of aluminum, the layer is typically 2000 Angstroms thick. The wafers are aligned and bonded by heating to a temperature of 700° C. for 1 hour, or by any other convenient method that provides a stress free bond. The combined slabs are wet etched in order to cut gaps 163 and define flexures 162 and 164. In FIG. 1, the assembly is shown with a left-right misalignment to illustrate that the alignment is not critical, since the dimensions of the gaps and proof masses are are on the order of millimeters in the horizontal direction in the Figure. The critical dimensions of microns are in the vertical direction in the Figure and are not affected by misalignment.

Alternatively, a dielectric material such as a glass can be deposited by techniques such as ion milling on one slab. Subsequently, the second slab is electrostatically bonded to the deposited dielectric layer. If desired, the top and bottom slabs can be electrically isolated by this method, which provides additional flexibility for the associated electrical current that measure the capacitance.

According to the present invention, the flexures 162 and 164 are fabricated by masking and boron doping the top surface of a silicon wafer illustratively 10 mils in thickness such that the limit of $6 \times 10^{19}$ boron atoms per cubic centimeter is reached at the depth corresponding to the desired flexure thickness, illustratively 2 microns. With this arrangement, the boron layers, in the top and bottom surfaces, serve as etch stops for a standard anisotropic etchant, illustratively ethylenediamine pyrocatohol (EDP), so that when gap 163 is etched, the gap is opened until the boron layer is reached which serves as an etch stop in those areas where it exists and the etchant opens the apertures around the gap 163. Preferably, the wafer is etched from both top and bottom at the same time by immersing in a fluid bath.

With this technique, the thickness of the flexures is precisely defined. Moreover, the flexures are located precisely adjacent to the mid-plane of the proof mass, overcoming the major short fall of prior art techniques.

Referring back to FIG. 1, it can be seen that the cross section is taken through the Y/Z plane showing two of flexures 162 at the top of proof mass 110. Apertures 24 in the top plate 20 and 26 in bottom plate 30 have been opened by any convenient etching method to sharply define the area of the variable capacitors formed by plates 20 and 30 and the proof mass 110 and also to reduce parasitic capacitance. When the proof mass is displaced downward, gas will be forced out of or into the inter-plate chambers 32 and 34 into these apertures and into other apertures described below.

It has been found that substantial factors in the temperature and temporal stability of capacitor transducers are the temperature coefficient and the aging characteristics of the glass dielectric 22 which bonds together the several plates of the capacitor. The smaller the bond area and the greater the thickness of the glass dielectric 22 between plates 20 and 30 and the frame 105, the less effect the temperature and aging will have on the capacitance measurement being made. Preferably, the thickness of bonding glass 22 is relatively large compared with the capacitor gap and the horizontal dimension of the bonding glass 22 is relatively small compared with the width of mesa 31. In an illustrative example, the width of mesas 31 and 33 was about 0.150 inch and the width of the glass 22 was about 0.010 inch. Illustratively, the entire arrangement will be enclosed in a hermetically sealed enclosure having a pressure chosen for convenient damping and a gas volume communicating with apertures 24 and 26 far in excess of the volume of capacitance chambers 32 and 34 plus the apertures 24 and 26.

In operation, as the unit is accelerated upwards along axis 230, the proof mass 110 will drop toward the bottom in the diagram reducing the gap between surfaces 56 and 58 and thus, the gas volume in lower chamber 34. Insulating travel stops 72 are shown as being located at various locations on mesas 31 and 33 in order to prevent the proof mass from coming in contact with either mesa. These stops are illustratively glass coated in order to prevent electrical short circuits when the proof mass touches them and have illustrative dimensions of 0.005 inch in width and 0.4 micron in height, with a glass layer of 0.5 micron in thickness for insulation.

The squeeze film damping phenomenon is used to control the frequency response of the proof mass. A sample channel or passageway 42 is shown that serves to provide a reservoir to hold displaced gas that is squeezed out from the volume between the plates. This channel will be part of a network covering surfaces 58 and 52. As chamber 34 contracts, gas is forced into these reservoirs 42. The total volume of the gas reservoirs should be considerably greater than the change in volume of gas chamber 34 so that there will be only a small increase in pressure in the reservoirs. Preferably, the ratio is about 10 to 1 or greater and the channels have a width of 0.005" and a depth of 12 microns. Channels 42 are formed by any of the standard silicon processing techniques, such as ion milling or reactive ion etching. Since the passageways are relatively shallow, little additional surface area is removed beyond that associated with their width in spite of the non-vertical walls that result from a wet etch process, as illustrated in the figure. In contrast, if the passageways are formed in the proof mass, its much greater thickness (typically 0.01") requires deep trenches in order to form the through holes, thereby removing appreciable mass and surface area. Thus, the surface area effectively available for the capacitor is much reduced, and for a given capacitance the area of the capacitor itself must be larger. With this arrangement of relatively narrow shallow trenches in mesas 31 and 33, the effective area available for the capacitance measurement is maximized and, since the proof mass is not pierced and trenched, maximum inertial mass is retained. These channels 42 communicate with reservoir 26 by extending perpendicular to the plane of the paper and/or in the plane of the paper.

The overall arrangement of upper plate 20, lower plate 30 and frame 105 is supported by any convenient means, such as a three-dimensional lower frame having a generally U-shaped cross section and connected to frame 105 by glass joints similar to joints 22. An advantage of this method is that the thermal effects of heat conduction or loss to the outside world are entered through frame 105 symmetrically relative to the upper and lower plates. If the device were mounted on lower plate 30, for example, that would usually be at a different temperature from upper plate 20 with consequent thermal stresses and distortion and different temperatures experienced by the glass dielectric capacitors.

For a given surface area, the capacitance of the upper and lower capacitors is set by the gap between the proof mass and the surfaces of the top and bottom plates. This gap, illustratively 2 microns, is determined both by the thickness of glass layers 22 which are deposited across the surface of the wafers and etched away except in predetermined areas and by the heights of mesas 31 and 33. Consequently, the gap can be controlled simply by changing the thickness of glass layer 22, in contrast to other art wherein the gap is set by removing material from the face of the proof mass. It is a further advantageous feature of this invention that the network of damping passageways have minimal impact on the surface areas 52 and 58, and therefore on the capacitance, and being located on the plates 20 and 30 rather than on the proof mass 110 have no effect on the maximum detectable acceleration $G_{max}$. For a given capacitance, the full scale range can be controlled independently by selecting the thickness of the proof mass and by controlling the numbers and the thicknesses of flexures 162 and 164 and their lengths and widths. In the illustrative embodiment, flexures 162 and 164 had a thickness of 2.5 microns and respective widths of 0.066" and 0.033" for gap spacing 163 of 0.010" and a proof mass 110 having a thickness of 0.010" and a mass of 7 milligrams. Since no material is removed from the proof mass to create the damping passageways in this invention, $G_{max}$ is independent of damping characteristics. Further, since the sensitivity is proportional to the ratio of the nominal capacitance to $G_{max}$, two of the three parameters, sensitivity, capacitance and $G_{max}$ can be selected independently with the damping characteristics being virtually independent of these. This is in contrast to prior art designs wherein these parameters are all closely linked together and compromised because of the extensive sculpturing of the proof mass.

Referring now to the method of fabrication, the top and bottom silicon slabs 20 and 30 having a nominal thickness of 0.050" have within them top and bottom mesas referred to by the numerals 33 and 31, respectively. These mesas are formed by repeated oxidation of the areas that will be gas plenums 24 and 26 and that will contain the glass spacers 22, followed by etching to remove the silicon dioxide formed in repeated oxidation. The result of this method is a desirable, tightly controlled mesa area surrounded by extremely smooth surface upon which the glass dielectric is deposited. Further details may be found in copending commonly owned application, U.S. Ser. No. 7/317,309, filed on the same day herewith and incorporated by reference herein.

In an preferred embodiment, a closed loop configuration would result in even better performance. The electronic portion of the apparatus is illustrated schematically in box 310. This box contains straightforward circuits which may apply forcing voltages to the electrodes for closed loop operation and also to sense capacitance by monitoring the unbalance of the high frequency bridge circuit of which the three-plate capacitor forms a part. A signal proportional to the external acceleration is derived from the forcing voltages required to return the proof mass to its null position. Further details may be found in copending commonly owned application, U.S. Ser. No. 7/317,239, filed on the same day herewith and incorporated by reference herein.

It should be understood that the invention is not limited to the particular embodiments shown and described herein, but that various changes and modifications may be made without departing from the spirit and scope of this novel concept as defined by the following claims.

What is claimed is:

1. A solid-state silicon accelerometer comprising:
   a three-plate capacitor including fixed top and bottom plates and a silicon movable sensing plate having a top surface separated from said top plate by a top gap and a bottom surface separated from said bottom plate by a bottom gap, defining a reference midplane and being connected to support members by flexible connections extending across a support gap between said silicon sensing plate and said support members to move between said top and bottom plates in response to acceleration along an acceleration axis perpendicular to said reference midplane, whereby acceleration along said acceleration axis displaces said silicon sensing plate from said reference midplane and alters the capacitance between said silicon sensing plate and said top and bottom plates, in which;
   said top and bottom plates and said support members are bonded together to form a rigid structure;
   said silicon sensing plate is connected to said support members by at least one pair of flexures extending a predetermined hinge width along opposite sides of said sensing plate and having a predetermined hinge length less than the length of said sensing plate, so that a communication path is established between a top chamber between said top and said silicon sensing plates and a bottom chamber between said bottom and said silicon sensing plates;
   at least one chamber has motion stops disposed therein and grooves to facilitate squeeze-film damping in one of said silicon sensing plate and said fixed plate; and electronic means for measuring the capacitance of at least one of said chambers, characterized in that:

said silicon sensing plate is formed from top and bottom silicon slabs bonded together at an interface region, each of said silicon slabs being boron doped on a flexure surface abutting said interface region, and is connected to said support members by flexures lying substantially in said flexure surfaces and being disposed about said support gap in a predetermined pattern, whereby said top and bottom silicon slabs combine to form a composite sensing plate connected to said support members by said at least one pair of flexures disposed symmetrically in said top and bottom plates and substantially in said sensing plate midplane, said top silicon slab, a corresponding top slab portion of said support members and a corresponding top slab flexure and said bottom silicon slab, a corresponding bottom slab portion of said support member and a corresponding bottom slab flexure being micromachined from a block of silicon.

2. An accelerometer according to claim 1, further characterized in that said interface region is formed from a layer of metal bonded to said top and bottom silicon slabs.

3. An accelerometer according to claim 1, further characterized in that said interface region is formed from a layer of dielectric material.

4. An accelerometer according to claim 3, further characterized in that said interface region is formed from a layer of dielectric material and in which said top and bottom silicon slabs are electrically isolated from one another.

5. An accelerometer according to claim 1, further characterized in that said movable silicon sensing plate has a rectangular shape and opposite corners in said reference midplane and said at least one pair of flexures comprises a plurality of pairs of flexures disposed symmetrically about said acceleration axis with respect to a pair of diagonal axes extending in said reference midplane through said acceleration axis.

6. An accelerometer according to claim 5, further characterized in that said flexures of said plurality of pairs of flexures are disposed azimuthally about said acceleration axis and sequentially above and below said reference midplane.

7. An accelerometer according to claim 6, further characterized in that said silicon sensing plate has a square cross section in said reference midplane.

* * * * *

UNITED STATES PATENT AND TRADEMARK OFFICE
CERTIFICATE OF CORRECTION

PATENT NO. : 5,008,774

DATED : April 16, 1991

INVENTOR(S) : Robert H. Bullis et al

It is certified that error appears in the above-indentified patent and that said Letters Patent is hereby corrected as shown below:

The title page, should be deleted to be replaced with the attached title page.

The drawing sheets, consisting of Figs. 1 and 2, should be deleted to be replaced with the drawing sheets, consisting of Figs. 1 and 2, as shown on the attached pages.

United States Patent [19]
Bullis et al.

[11] Patent Number: 5,008,774
[45] Date of Patent: Apr. 16, 1991

[54] CAPACITIVE ACCELEROMETER WITH MID-PLANE PROOF MASS

[75] Inventors: Robert H. Bullis, Avon; James L. Swindal, East Hampton, both of Conn.

[73] Assignee: United Technologies Corporation, Hartford, Conn.

[21] Appl. No.: 317,258

[22] Filed: Feb. 28, 1989

[51] Int. Cl.⁵ .................. G01P 15/02; H01G 7/00
[52] U.S. Cl. ...................... 361/283; 73/517 R
[58] Field of Search ................. 361/283; 73/517

[56] References Cited

U.S. PATENT DOCUMENTS

| | | | |
|---|---|---|---|
| 4,193,291 | 3/1980 | Lynnworth | 73/32 A |
| 4,244,225 | 1/1981 | Greenwood | 73/517 AV |
| 4,574,327 | 3/1986 | Wilner | 361/283 |
| 4,609,963 | 9/1986 | Wilner | 361/320 |
| 4,658,647 | 4/1987 | Shintani et al. | 73/517 B |
| 4,679,434 | 7/1987 | Stewart | 73/517 B |
| 4,699,006 | 10/1987 | Boxenhorn | 73/517 |

FOREIGN PATENT DOCUMENTS

| | | |
|---|---|---|
| 2130372 | 5/1984 | United Kingdom . |
| 2130373 | 5/1984 | United Kingdom . |
| 2158945 | 5/1984 | United Kingdom . |

Primary Examiner—Donald A. Griffin

[57] ABSTRACT

A micromachined three-plate capacitive accelerometer incorporates a "sandwich" proof mass formed from two layers that are boron-doped to define hinges attached essentially to the midplane of the proof mass by being placed abutting a bonding interface region at the midplane.

7 Claims, 2 Drawing Sheets

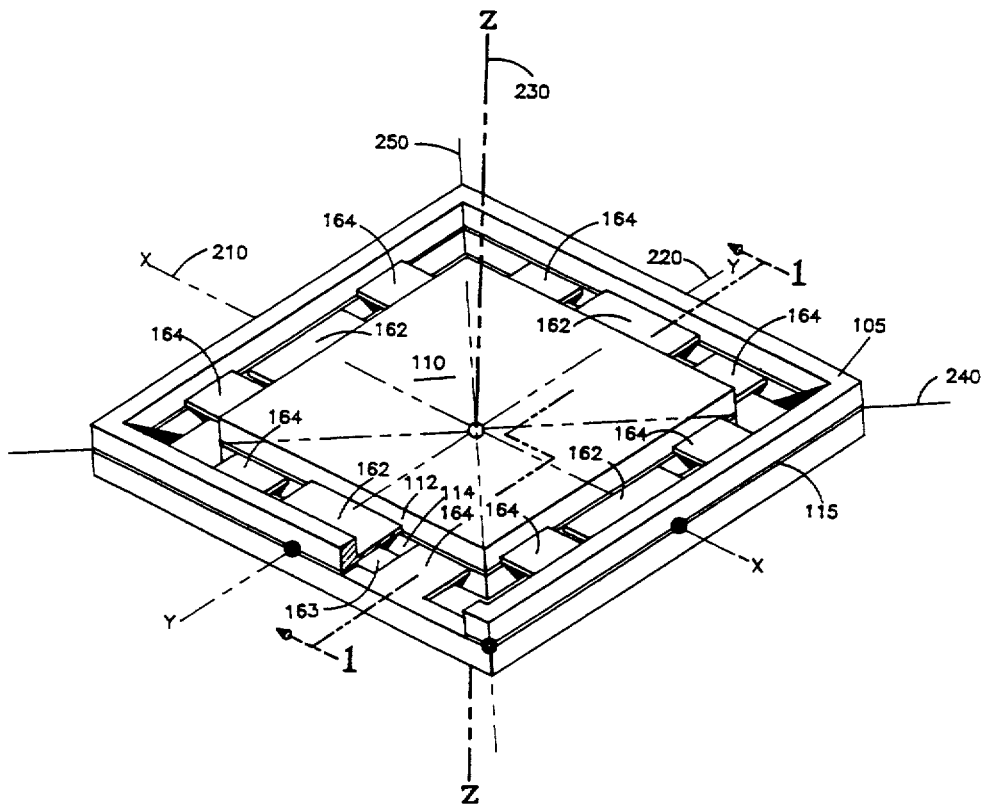

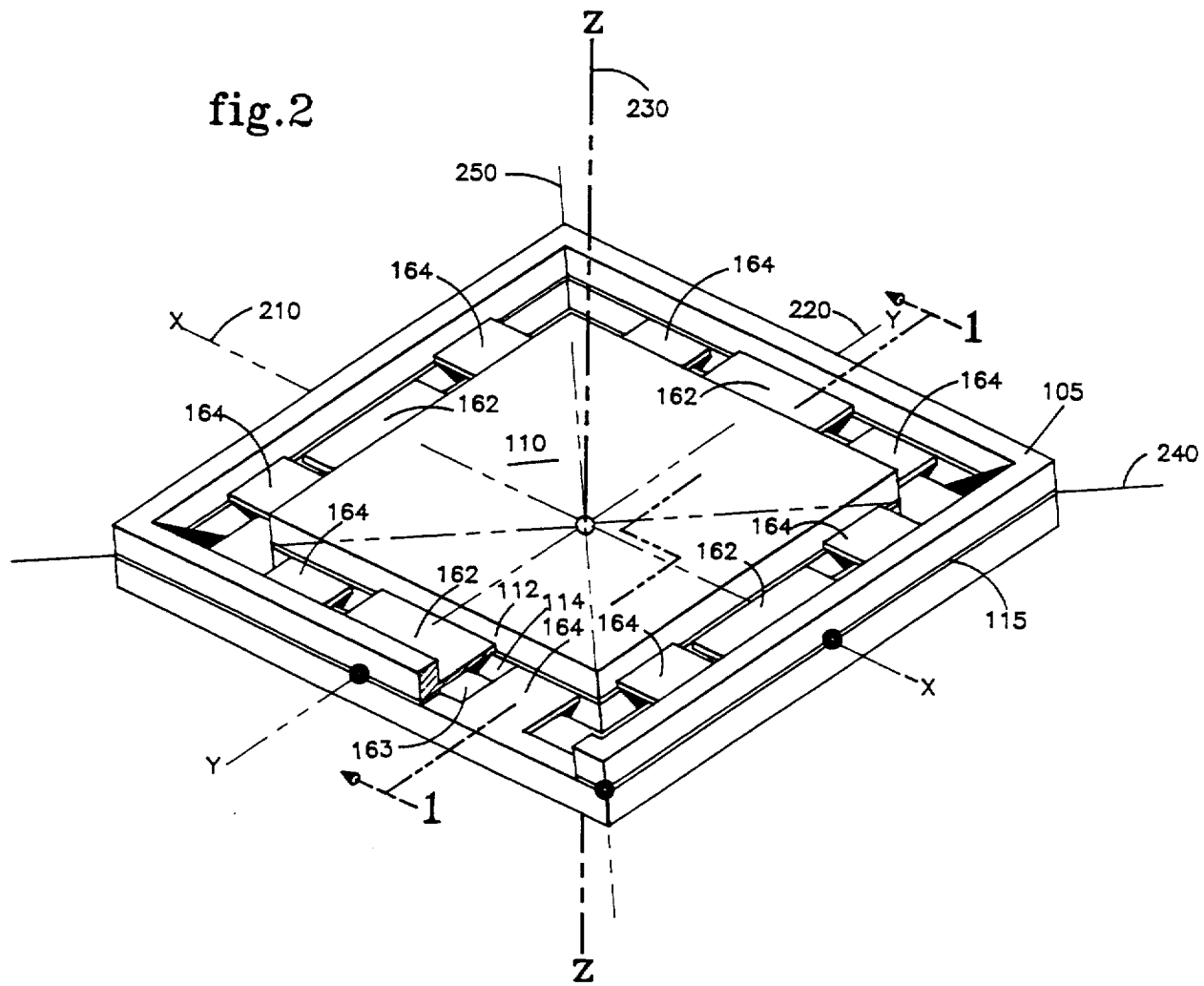

UNITED STATES PATENT AND TRADEMARK OFFICE
CERTIFICATE OF CORRECTION

PATENT NO. : 5,008,774

DATED : April 16, 1991

INVENTOR(S) : Robert H. Bullis et al

It is certified that error appears in the above-identified patent and that said Letters Patent is hereby corrected as shown below:

Col. 2, line 6, after "the invention" insert --along the line 1-1 of Fig. 2--

Col. 2, line 37, after "right flexures" insert --164, 162--

Col. 4, lines 14-15, after "section" cancel "is taken through the Y/Z plane showing two of flexures 162 at the top of proof mass 110", and substitute therefor --shows 2 fixtures 164, 162 at the top and bottom, respectively, of the proof mass 110--

Signed and Sealed this

Twelfth Day of October, 1993

BRUCE LEHMAN

*Attesting Officer*     *Commissioner of Patents and Trademarks*